US008281828B2

(12) United States Patent  (10) Patent No.: US 8,281,828 B2
Matsushita  (45) Date of Patent: Oct. 9, 2012

(54) PNEUMATIC TIRE WITH TREAD HAVING LUG GROOVES AND SIPES

(75) Inventor: Kohtaro Matsushita, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 595 days.

(21) Appl. No.: 12/466,096

(22) Filed: May 14, 2009

(65) Prior Publication Data

US 2009/0301621 A1 Dec. 10, 2009

(30) Foreign Application Priority Data

Jun. 4, 2008 (JP) ................................ 2008-146795

(51) Int. Cl.
*B60C 11/12* (2006.01)
(52) U.S. Cl. ......... 152/209.17; 152/209.18; 152/209.22; 152/209.27; 152/29.28; 152/DIG. 3
(58) Field of Classification Search ............. 152/209.17, 152/209.18, 209.22, 209.27, 209.28, DIG. 3
See application file for complete search history.

(56) References Cited

U.S. PATENT DOCUMENTS

| 5,240,053 | A | * | 8/1993 | Baumhofer et al. | ...... 152/209.22 |
| D417,174 | S | * | 11/1999 | Lee | ............... D12/546 |
| 7,942,177 | B2 | * | 5/2011 | Nakamura | ............... 152/209.22 |
| 2002/0139460 | A1 | * | 10/2002 | Boiocchi et al. | ............ 152/209.2 |
| 2008/0035256 | A1 | * | 2/2008 | Yamane | ........................ 152/154 |

FOREIGN PATENT DOCUMENTS

| CZ | 279543 B6 | * | 5/1995 |
| CZ | 279546 B6 | * | 5/1995 |
| EP | 604383 A1 | * | 6/1994 |
| JP | A 6-55913 | | 3/1994 |
| JP | 07-290907 A | * | 11/1995 |
| JP | 2002-067623 A | * | 3/2002 |
| JP | A 2002-67623 | | 3/2002 |
| JP | A 2007-230251 | | 9/2007 |

OTHER PUBLICATIONS

Machine translation for Japan 07-290907 (no date).*
Machine translation for Europe 604,383 (no date).*
Machine translation for Japan 2002-067623 (no date).*

* cited by examiner

*Primary Examiner* — Steven D Maki
(74) *Attorney, Agent, or Firm* — Greer, Burns & Crain, Ltd.

(57) ABSTRACT

Provided is a pneumatic tire capable of providing improved lateral sliding resistance on snow, improved traction on snow, and improved uneven-wear resistance. The provided tire includes: at least one circumferential main groove formed in a tread portion and extending in the tire-circumferential direction; and plural columns of land areas defined in the tread portion by the circumferential main groove. Plural lug grooves and plural sipes are formed in at least one of the plural land-area columns. Each of the lug grooves extends in the tire-width direction. At least one end of each lug groove is formed as a dead end located in the corresponding land area. Each of the sipes extends so as to surround the corresponding lug groove. Each sipe intersects with the lug groove in question, and is communicatively connected to the corresponding single one of the circumferential main grooves at the two ends of the sipe.

14 Claims, 2 Drawing Sheets

US 8,281,828 B2

PNEUMATIC TIRE WITH TREAD HAVING LUG GROOVES AND SIPES

BACKGROUND OF THE INVENTION

The present invention relates to a pneumatic tire suitable for use throughout all seasons. To be more specific, the present invention relates to a pneumatic tire having improved lateral sliding resistance and traction on snow as well as improved resistance to uneven wear.

An all-season pneumatic tire is required to have excellent resistance to uneven wear as well as to securely have sufficient lateral sliding resistance and traction on snow in the event of snowfall.

A conventional tread pattern employed in the all-season tire includes plural circumferential main grooves which are formed in the tread portion and each of which extends in the tire-circumferential direction. The plural circumferential main grooves define plural columns of land areas in the tread portion. The land areas have plural lug grooves each of which extends in the tire-width direction and plural sipes each of which also extends in the tire-width direction (see, for example, Japanese patent application Kokai publications No. 6-55913, No. 2002-67623, and No. 2007-230251.)

The lug grooves extending in the tire-width direction are effective in securing traction on snow. Assigning a wider part of the tread portion to lug grooves, however, lowers down the tread stiffness and thus lowers down its resistance to uneven wear. Besides, such assignment makes the tire more prone to lateral sliding on snow. Accordingly, it is difficult to provide an all-season tire with both improved lateral sliding resistance and improved traction on snow as well as with secured excellent resistance to uneven wear.

SUMMARY OF THE INVENTION

An object of the present invention is to provide a pneumatic tire capable of providing both improved lateral sliding resistance and traction on show as well as improved resistance to uneven wear.

To achieve the above-mentioned object, an aspect of the present invention provides a pneumatic tire with the following characteristic features. The provided pneumatic tire includes: at least one circumferential main groove formed in a tread portion and extending in the tire-circumferential direction; and a plurality of columns of land areas defined by the circumferential main groove in the tread portion. A plurality of lug grooves and a plurality of sipes are formed in at least one of the plurality of land-area columns. Each of the lug grooves extends in the tire-width direction, and at least one end of each lug groove is formed as a dead end located in the corresponding land area. Each of the sipes extends so as to surround the corresponding lug groove. Each sipe intersects with the lug groove in question, and is communicatively connected to the corresponding single one of the circumferential main grooves at the two ends of the sipe.

According to the aspect of the present invention, in at least one of the land-area column, at least one end of each lug groove is formed as a dead end located in the corresponding land area. Accordingly, lateral sliding on snow can be reduced. Sufficient tread stiffness can be secured, so that an improvement in uneven-wear resistance can be obtained. In addition, when at least one end of each lug groove is formed as a dead end located in the corresponding land area, the lowering of the traction performance on show may be caused by the stuffing of the lug grooves with snow. However, to counter the lowering of the traction performance, the sipes are provided with the following construction. Each sipe extends so as to surround the corresponding lug groove, and intersects with the lug groove in question. Each sipe is communicatively connected to the corresponding single one of the circumferential main grooves at the two ends of the sipe. The providing of such sipes encourages the lug grooves to deform a little, and makes it easier to clear the lug grooves of the snow that the lug grooves have been stuffed with. Consequently, the tire can provide improved traction on snow.

In the pneumatic tire of the present invention, it is preferable that each sipe include a pair of parallel sections extending in parallel with the corresponding lug groove, and that each sipe and the corresponding lug groove be formed so as to satisfy a relationship:

$$L1/L = 0.4 \text{ to } 0.6$$

where L is the distance in the tire-circumferential direction between the two parallel sections, and L1 is the distance from any one of the two parallel sections to the center position, in the groove width direction, of the corresponding lug groove. The formation of each lug groove approximately at the center between the two parallel sections of the corresponding sipe can result in an excellent uneven-wear resistance.

The above-described sets of lug grooves and sipes may be formed in any of the land areas defined in the tread portion. For example, the sets of the lug grooves and the sipes may be formed in land areas located respectively in shoulder sections of the tread portion. In this case, the uneven wear that occurs in the shoulder portions of the tire can be reduced effectively. Alternatively, when at least two of the circumferential grooves each extending in the tire-circumferential direction are formed in the tread portion of a pneumatic tire, the sets of the lug grooves and the sipes may be formed in a land area located on the side that is closer to the tire center of a land area located in each shoulder section. In this case, the lateral sliding resistance on snow can be improved effectively.

The present invention can be employed in a pneumatic tire including: at least one main groove extending in the tire-circumferential direction and formed in the tread portion; and plural columns of land areas are defined in the tread portion by the circumferential main groove. The present invention is especially effective in a pneumatic tire including: four circumferential main grooves each extending in the tread portion and formed in the tread portion; and five columns of the land areas defined in the tread portion by the four circumferential main grooves. A pneumatic tire of the present invention with such a construction is suitable for the use as an all-season tire.

It is especially preferable that the pneumatic tire further include a fine groove, plural curved grooves, and plural sipes with their respective constructions described as follows. The fine groove extends in the tire-circumferential direction and is formed at the center of the land area located in the center section of the tread portion. The plural curved grooves are formed in the land area located in the center section of the tread portion. Each curved groove extends from either one of the circumferential main groove towards the fine groove. The plural sipes are formed in the land area located in the center section of the tread portion. Each sipe extends from either one of the circumferential main groove towards the fine groove. The plural curved grooves and the plural sipes are arranged alternately in the tire-circumferential direction. Each curved groove intersects with the corresponding sipe. In addition, it is preferable that the pneumatic tire have the following construction. Each curved groove formed in the land area located in the center section has a dead end located between the corresponding circumferential main groove and the fine groove. Both the width and the depth of each curved groove formed in the land area located in the center section are gradually reduced from its open end towards its closed end. The sipes formed in the land area located in the center section are communicatively connected to the fine groove. Each sipe includes a deeper section located between the corresponding circumferential main groove and the intersection with the corresponding curved groove, and also includes a shallower section located between the fine groove and the intersection with the corresponding curved groove. Accordingly, sufficient stiffness can be secured for the land area located in the center section of the tread portion, so that the driving stability and the braking performance on the road surface in the dry conditions can be improved. In addition, the intersecting of the curved grooves with their respective sipes in the land area located in the center section encourages the rolling of the tire to cause the deformation of the curved grooves formed in the land area located in the center section. Such deformation makes it easier to clear the curved grooves of the snow that the curved grooves have been stuffed with. Consequently, the tire with such construction can result in a better performance of the vehicle running on snow.

In the descriptions of the present invention, the circumferential main groove refers to a groove with a groove width of 6.0 mm to 18.0 mm and a groove depth of 6.0 mm to 16.0 mm. The fine groove refers to a groove with a groove width of 1.0 mm to 3.0 mm and a groove depth of 2.0 mm to 5.0 mm. Each of the lug groove and the curved groove has neither groove width nor groove depth specifically defined, but is preferably narrower and shallower than the main groove. To provide improved traction on snow, each of the lug grooves is angled at 60° or smaller relative to the tire-width direction. The sipe refers to a groove with a groove width of 0.5 mm to 2.0 mm and a groove depth of 2.0 mm to 10.0 mm.

DETAILED DESCRIPTION OF THE PREFERRED EMBODIMENTS

Figure 1:
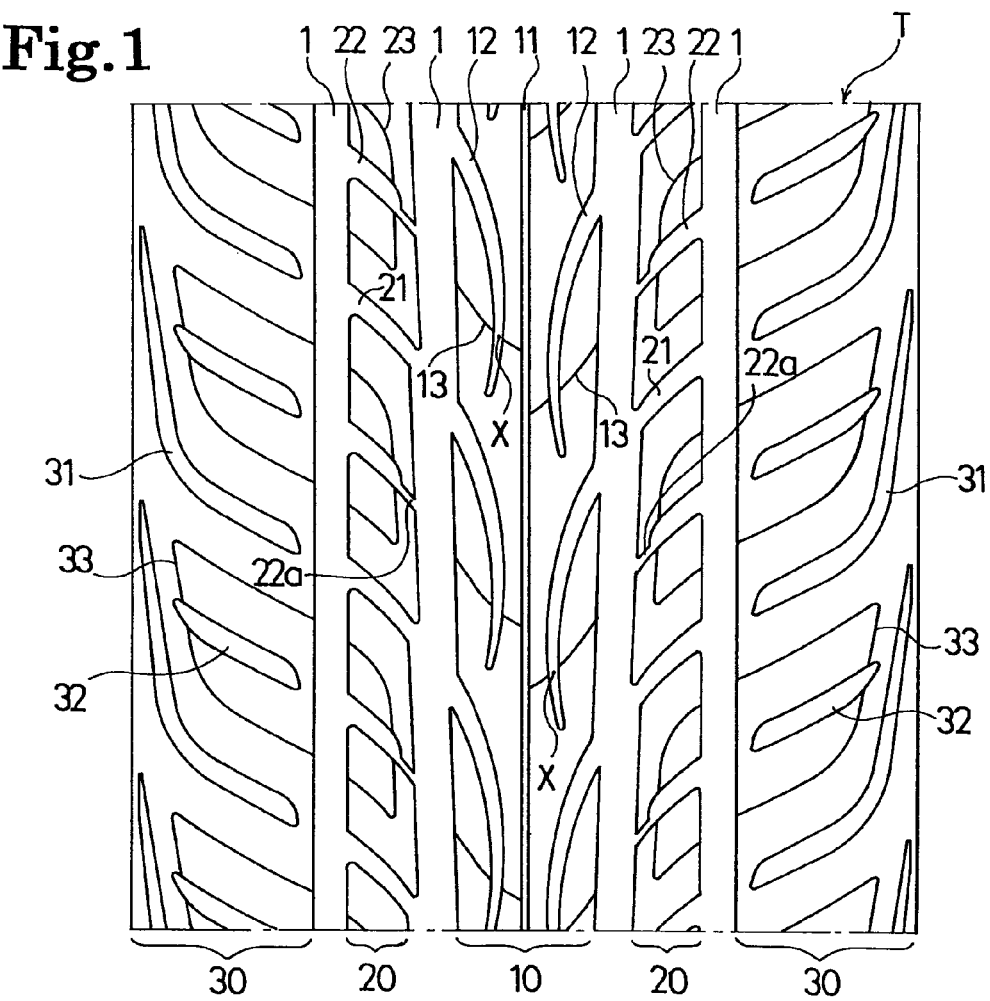
FIG. 1 is a development view illustrating a tread pattern of a pneumatic tire according to an embodiment of the present invention.
Figure 2:
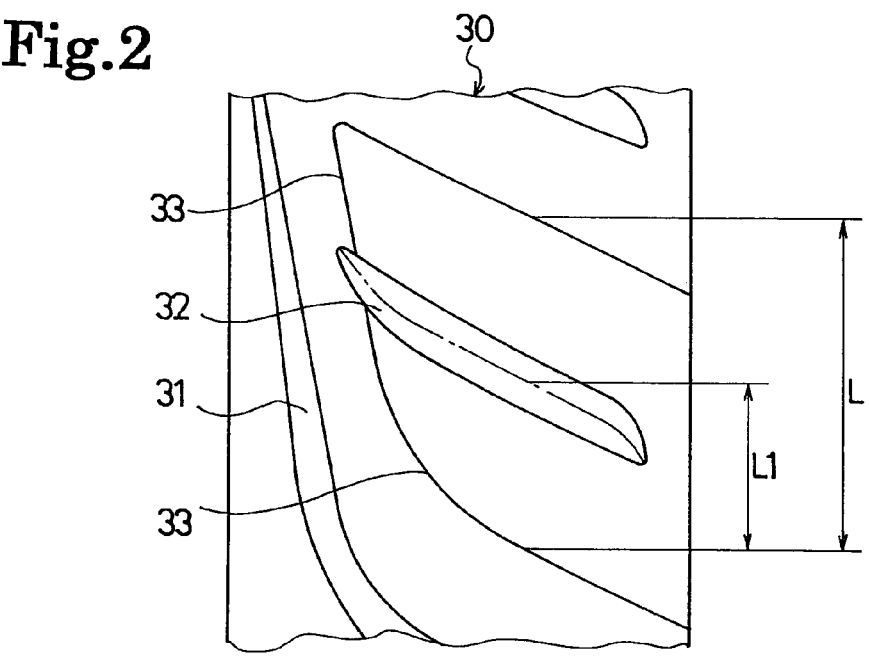
FIG. 2 is an enlarged view illustrating a principal portion of the tread pattern shown in FIG. 1.

A configuration of the present invention will be described below in detail by referring to the accompanying drawings. FIG. 1 is a development view illustrating a tread pattern of a pneumatic tire according to an embodiment of the present invention. FIG. 2 is an enlarged view illustrating a principal portion of the tread pattern shown in FIG. 1.

FIG. 1 shows that four circumferential main grooves 1 each of which extends in the tire-circumferential direction are formed in a tread portion T. The four circumferential main grooves 1 define five columns of land areas in the tread portion T. That is, a land area 10 located in the central section of the tread portion T; a pair of land areas 20 and 20 located on the two sides of the land area 10, respectively; and a pair of land areas 30 and 30 located in the shoulder sections, respectively.

A straight fine groove 11 extending in the tire-circumferential direction is formed in the land area 10 located in the central section of the tread portion T. Specifically, the fine groove 11 is formed at the center, in the width direction, of the land portion 10. The fine groove 11 is narrower and shallower than the circumferential main grooves 1, so that the fine groove 11 does not cause substantially any loss of the stiffness of the land portion 10. In addition, plural curved grooves 12 and plural sipes 13 are also formed in the land area 10. The curved grooves 12 and the sipes 13 extend from the corresponding one of the circumferential main grooves 1 towards the fine groove 11. The curved grooves 12 alternate with the sipes 13 in the tire-circumferential direction. Every one of the curved groove 12 intersects with the corresponding one of the sipes 13.

Figure 3:
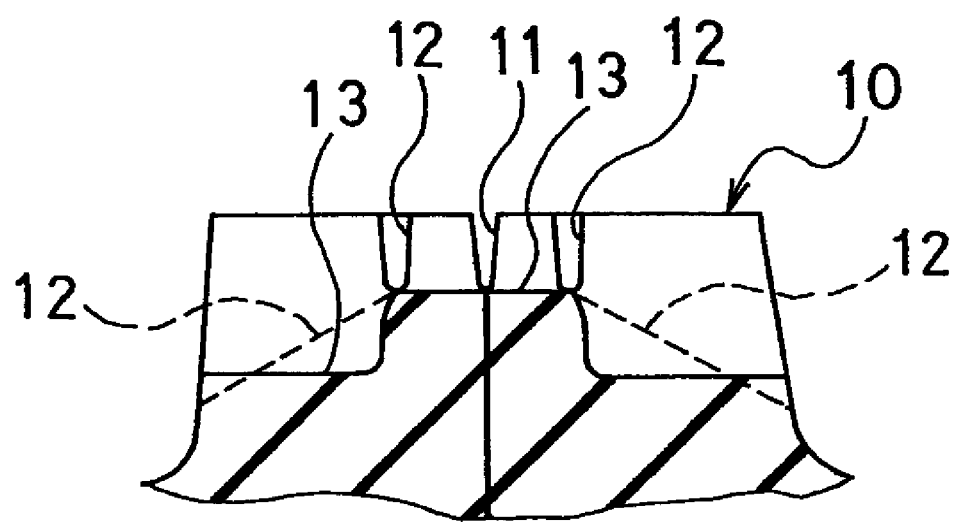
FIG. 3 is a sectional view, taken along a sipe, of a land area located in the central section of the tread portion in the tread pattern shown in FIG. 1.

Each curved groove 12 formed in the land area 10 is discontinued at a position between the circumferential main groove 1 and the fine groove 11. Both the width and the depth of the curved groove 12 are gradually reduced from its open end towards its closed end. The sipes 13, on the other hand, are formed so as to be communicatively connected to the fine groove 11. Each sipe 13 has a deeper part located between the circumferential main groove 1 and the intersection X with the curved groove 12 as well as a shallower part located between the fine groove 11 and the intersection X with the curved groove 12. FIG. 3 illustrates a section of the land area 10 taken along the sipes 13. FIG. 3 shows that each of the curved grooves 12 and the sipes 13 has a shallower part located near the center of the land area 10.

Each of the land areas 20 located respectively at the two outer sides of the land area 10 has plural lug grooves 21 and plural lug grooves 22. Each lug groove 21 extends in the tire-width direction and is communicatively connected to the circumferential main grooves 1 at its two ends, respectively. Each lug groove 22 also extends in the tire-width direction. One end of the lug groove 22 is a dead end located in the land area 20, whereas the other end of the lug groove 22 is communicatively connected to the circumferential main groove 1 on the shoulder side. The lug grooves 21 alternates with the lug groove 22 in the tire-circumferential direction. Note that a cutaway 22a, which has a groove width of 1.2 mm or smaller and a groove depth of 4.2 mm or smaller, is formed between the closed dead end of each lug groove 22 and the corresponding circumferential main groove 1. When the dimensions of the cutaway 22a are very small as described above, the one end of the groove 22 can be substantially regarded as a dead end located in the land area 20.

Plural sipes 23 are also formed in each of the land areas 20. Each sipe 23 extends so as to surround the corresponding one of the lug grooves 22, but intersects, at a point, with the lug groove 22 in question. Each sipe 23 is communicatively connected to the corresponding single one of the circumferential main grooves 1 at its two ends. Each segmented portion surrounded by each sipe 23 and the corresponding main groove 1 is a structure that is independent of the other portion of the land area 20. The formation of such independent segmented portions each surrounding the corresponding lug groove 22 allows the lug groove 22 to deform a little.

Each of the land areas 30 located respectively in the shoulder sections of the tread portion T has plural lug grooves 31 and plural lug grooves 32. Each lug groove 31 extends in the tire-width direction. One end of the lug groove 31 is discontinued at a position in the land area 30, whereas the other end of the lug groove 31 extends outwards until a position outside the contact area of the tire as bending in the tire-circumferential direction. Each lug groove 32 extends in the tire-width direction. The two end of the lug groove 32 are discontinued at two positions in the land area 30. The lug grooves 31 alternate with the lug grooves 32 in the tire-circumferential direction.

Plural sipes 33 are also formed in each of the land areas 30. Each sipe 33 extends so as to surround the corresponding one of the lug grooves 32, but intersects, at a point, with the lug groove 32 in question. Each sipe 33 is communicatively connected to the corresponding single one of the circumferential main grooves 1 at its two ends. Each segmented portion surrounded by each sipe 33 and the corresponding main groove 1 is a structure that is independent of the other portion of the land area 30. The formation of such independent segmented portions each surrounding the corresponding lug groove 32 allows the lug groove 32 to deform a little.

In the above-described pneumatic tire, each of the land areas 30 located respectively in the shoulder sections of the tread portion T has the following construction. Each of the lug grooves 32 formed in the land areas 30 has two dead ends located in the corresponding one of the land areas 30. To put it differently, each lug groove 32 is not communicatively connected to the corresponding one of the main grooves 1. Accordingly, lateral sliding on snow can be reduced while certain tread stiffness can be secured and thus improved resistance to uneven wear can be obtained. The uneven wear in the shoulder portions, in particular, can be reduced effectively. In addition, the two ends of each of the lug grooves 32 are dead ends located in the corresponding land area 30. Moreover, the sipes 33 each extending so as to surround the corresponding one of the lug grooves 32 and intersecting with the lug groove 32 in question are formed so that the two ends of each sipe 33 are communicatively connected to the corresponding single circumferential main groove 1. Such a structure encourages the lug grooves 32 to deform a little, and such deformation in turn makes it easier to clear the lug grooves 32 of the snow that the lug grooves 32 have been stuffed with. Consequently, the tire can provide improved traction on snow.

Besides, while each of the land areas 30 is formed respectively in the shoulder sections of the tread portion T, the land areas 20 with the following construction are formed on the sides that are closer to the tire center of their respective land areas 30. At least one end of each of the lug grooves 22 formed in the land areas 20 is formed as a dead end located in the corresponding land area 20, so that each lug groove 22 is not communicatively connected to the corresponding one of the main grooves 1. Accordingly, lateral sliding on snow can be reduced while certain tread stiffness can be secured and thus improved resistance to uneven wear can be obtained. The lateral sliding resistance on snow, in particular, can be enhanced effectively. In addition, at least one end of each of the lug grooves 22 is formed as a dead end located in the corresponding land area 20. Moreover, the sipes 23 each extending so as to surround the corresponding one of the lug grooves 22 and intersecting with the lug groove 22 in question are formed so that the two ends of each sipe 23 are communicatively connected to the corresponding single circumferential main groove 1. Such a structure encourages the lug grooves 22 to deform a little, and such deformation in turn makes it easier to clear the lug grooves 22 of the snow that the lug grooves 22 have been stuffed with. Consequently, the tire can provide improved traction on snow.

In the above-described pneumatic tire, as FIG. 2 shows, each sipe 33 that surrounds the corresponding lug groove 32 has a pair of parallel sections that extends in parallel with the lug groove 32 in question. In FIG. 2, the distance, in the tire-circumferential direction, between these two parallel sections is denoted by L, and the distance from any one of the parallel sections to the central position, in the groove-width direction, of the lug groove 32 is denoted by L1. The lug groove 32 and the sipe 33 are arranged so that the distances L and L1 can have a relationship $L1/L=0.4$ to $0.6$. The formation of each lug groove 32 approximately at the center between the two parallel sections of the corresponding sipe 33 results in an excellent resistance to uneven wear. An L1/L ratio that is out of the above-mentioned range results in a lower effect of improving the resistance to the uneven wear. Note that each lug groove 22 and the corresponding sipe 23 formed in the land areas 20 have the same relationship as the one mentioned above.

In addition, in the above-described pneumatic tire, the land area 10 has the following construction. The fine groove 11 extending in the tire-circumferential direction is formed at the center of the land area 10. In the land area 10, the curved grooves 12 and the sipes 13 are formed alternately in the tire-circumferential direction. Each curved groove 12 intersects with the corresponding sipe 13. One end of the curved groove 12 is formed as a dead end located between the corresponding circumferential main groove 1 and the fine groove 11. Both the width and the depth of each curved groove 12 are gradually reduced from its open end towards its closed end. The sipes 13, on the other hand, are formed so as to be communicatively connected to the fine groove 11. Each sipe 13 has a deeper part located between the circumferential main groove 1 and the intersection X with the curved groove 12 as well as a shallower part located between the fine groove 11 and the intersection X with the curved groove 12. Accordingly, the land area 10 in the central section of the tread portion T can securely have sufficient stiffness, and such construction of the pneumatic tire can improve the driving stability and the braking performance of the vehicle running on a road surface in dry conditions. In addition, the intersecting of the curved groove 12 with their respective sipes 13 in the land area 10 encourages the curved grooves 12 of the land area 10 to deform while the tire is rolling. Such deformation of the curved grooves 12 makes it easier to clear the curved grooves 12 of the snow that the curved grooves 12 have been stuffed with. Such a construction of the tire can improve the performance of the vehicle running on snow.

A preferred embodiment of the present invention has been described thus far in detail. Various modifications, substitutions, and replacements can be made on the above-described embodiment as long as such alterations do not depart from the spirit and the scope of the present invention defined by the accompanying claims.

EXAMPLES

Pneumatic tires of Examples 1 to 5 were fabricated as follows. Each of the tires had a size specified as 215/60R16 and a tread pattern shown in FIG. 1. The distance L was defined as the distance, in the tire-circumferential direction, between the parallel sections of each sipe surrounding the corresponding lug groove while the distance L1 was defined as the distance from any one of the parallel sections of each sipe to the central position, in the groove-width direction, of the lug groove. The ratios L1/L of the pneumatic tires of Examples 1 to 5 were set as listed in Table 1.

For comparative purposes, a pneumatic tire of Comparative Example 1 was fabricated as follows. The pneumatic tire of Comparative Example 1 had the basically the same construction as that of the pneumatic tire of Example 3, but differed from it in the following points. One end of each of the lug grooves 32 formed in the land areas 30 positioned respectively in the shoulder sections of the tread portion was communicatively connected to the corresponding circumferential main groove 1. The sipes 33 were formed so as to extend, simply, in parallel with the corresponding lug groove 32 without intersecting therewith. The two ends of each of the lug grooves 22 formed in the land areas 20 were communicatively connected to the corresponding circumferential main grooves 1. The sipes 23 were formed so as to extend, simply, in parallel with the corresponding lug groove 22 without intersecting therewith.

In addition, a pneumatic tire of Comparative Example 2 was fabricated as follows. The pneumatic tire of Comparative Example 2 had the basically the same construction as that of the pneumatic tire of Example 3, but differed from it in the following points. The sipes 33 formed in the land areas 30 positioned respectively in the shoulder sections of the tread portion were formed so as to extend, simply, in parallel with the corresponding lug groove 32 without intersecting therewith. The sipes 23 formed in the land areas 20 were formed so as to extend, simply, in parallel with the corresponding lug groove 22 without intersecting therewith.

An assessment using these tires was conducted by an assessment method given below on: the lateral sliding resistance on snow; the traction performance on snow; and the uneven-wear resistance. Table 1 shows the assessment results.

Lateral Sliding Resistance on Snow

Each of the tested tires was fitted to a wheel with a rim size of 16×6.5 J and then the wheels with tires were mounted on a vehicle for testing. The tires were inflated with a pressure of 200 kPa. While the vehicle for testing was running on a snowy test course, a sensory assessment was conducted on the lateral sliding resistance. The assessment results shown in Table 1 are given by indices with the assessment result for Comparative Example 1 being normalized to 100. A larger index value for a tire means that the tire is more resistant to lateral sliding on snow.

Traction Performance on Snow

Each of the tested tires was fitted to a wheel with a rim size of 16×6.5 J and then the wheels with tires were mounted on a vehicle for testing. The tires were inflated with a pressure of 200 kPa. While the vehicle for testing was running on a snowy test course, a sensory assessment was conducted on the traction performance. The assessment results shown in Table 1 are given by indices with the assessment result for Comparative Example 1 being normalized to 100. A larger index value for a tire means that the tire is excellent in the traction performance on snow.

Uneven-Wear Resistance

Each of the tested tires was fitted to a wheel with a rim size of 16×6.5 J and then the wheels with tires were mounted on a vehicle for testing. The tires were inflated with a pressure of 200 kPa. The amount of uneven wear that occur in the shoulder portions was measured after the vehicle traveled km. The assessment results shown in Table 1 are given by indices using the reciprocals of the measured values with the assessment result for Comparative Example 1 being normalized to 100. A larger index value for a tire means that the tire is more resistant to uneven wear.

TABLE 1

|  | Comparative Example 1 | Comparative Example 2 | Example 1 | Example 2 | Example 3 | Example 4 | Example 5 |
| --- | --- | --- | --- | --- | --- | --- | --- |
| Non-communication structures between lug grooves and main grooves | Not exist | Exist | Exist | Exist | Exist | Exist | Exist |
| Intersecting structures between lug grooves and sipes | Not exist | Not exist | Exist | Exist | Exist | Exist | Exist |
| L1/L ratio | 0.5 | 0.5 | 0.35 | 0.4 | 0.5 | 0.6 | 0.63 |
| Lateral sliding resistance on snow (index) | 100 | 105 | 105 | 105 | 105 | 105 | 105 |
| Traction performance on snow (index) | 100 | 95 | 105 | 105 | 105 | 105 | 105 |
| Uneven-wear resistance (index) | 100 | 105 | 103 | 105 | 105 | 105 | 103 |

The assessment results shown in Table 1 reveal clearly that all the tires of Examples 1 to 5 had advantages over the tire of Comparative Example 1 with respect to the lateral sliding resistance on snow, the traction performance on snow, and the uneven-wear resistance. The tire of Comparative Example 2, in which at least one end of each lug groove was not communicatively connected to the corresponding circumferential main groove, had advantages over the tire of Comparative Example 1 with respect to the lateral sliding resistance on snow and the uneven-wear resistance. The construction with the above-mentioned lack of communicative connections, however, made the lug grooves more prone to be clogged with snow, so that the tire of Comparative Example 2 showed worse traction performance on snow than the tire of Comparative Example 1.

What is claimed is:
1. A pneumatic tire comprising:
at least one circumferential main groove formed in a tread portion and extending in the tire-circumferential direction;
a plurality of columns of land areas defined in the tread portion by the circumferential main groove;

a plurality of lug grooves formed in at least one of the plurality of land-area columns, each of the lug grooves extending in the tire-width direction and having at least one end formed as a dead end located in the corresponding land area; and a plurality of sipes each extending so as to surround the corresponding lug groove, each sipe intersecting with the lug groove in question in an area adjacent to the dead end of the lug groove, but without communicating with adjacent ones of the lug groove, and each sipe communicating with the corresponding single one of the circumferential main grooves at the two ends of the sipe.

2. The pneumatic tire according to claim 1, wherein:

each sipe includes a pair of parallel sections extending in parallel with the corresponding lug groove, and each sipe and the corresponding lug groove are formed so as to satisfy a relationship:

$$L1/L=0.4 \text{ to } 0.6$$

where L is the distance in the tire-circumferential direction between the two parallel sections, and L1 is the distance from any one of the two parallel sections to the center position, in the groove width direction, of the corresponding lug groove.

3. The pneumatic tire according to claim 1, wherein the lug grooves and the sipes are formed in land areas located respectively in shoulder sections of the tread portion.

4. The pneumatic tire according to claim 1, wherein:

at least two of the circumferential grooves each extending in the tire-circumferential direction are formed in the tread portion, and the lug grooves and the sipes are formed in a land area located on the side that is closer to the tire center of a land area located in each shoulder section.

5. The pneumatic tire according to any one of claims 1 to 4, wherein:

four of the circumferential main grooves each extending in the tread portion are formed in the tread portion, and five columns of the land areas are defined in the tread portion by the four circumferential main grooves.

6. The pneumatic tire according to claim 5 further comprising:

a fine groove extending in the tire-circumferential direction and formed at the center of the land area located in the center section of the tread portion;

a plurality of curved grooves formed in the land area located in the center section of the tread portion, each curved groove extending from either one of the circumferential main grooves towards the fine groove; and a plurality of sipes formed in the land area located in the center section of the tread portion, each sipe extending from either one of the circumferential main grooves towards the fine groove, wherein the plurality of curved grooves and the plurality of sipes are arranged alternately in the tire-circumferential direction, and each curved groove intersects with the corresponding sipe.

7. The pneumatic tire according to claim 6, wherein:

each curved groove formed in the land area located in the center section has a dead end located between the corresponding circumferential main groove and the fine groove, both the width and the depth of each curved groove formed in the land area located in the center section are gradually reduced from its open end towards its closed end, the sipes formed in the land area located in the center section communicate with the fine groove, and each sipe includes a deeper section located between the corresponding circumferential main groove and the intersection with the corresponding curved groove, and also includes a shallower section located between the fine groove and the intersection with the corresponding curved groove.

8. The pneumatic tire according to claim 1, the dead end of the lug groove with the intersecting sipe is located closer to a shoulder section of the tire than the other end of the lug groove.

9. A pneumatic tire comprising:

at least one circumferential main groove formed in a tread portion and extending in the tire-circumferential direction;

a plurality of columns of land areas defined in the tread portion by the circumferential main groove;

a plurality of lug grooves formed in at least one of the plurality of land-area columns, each of the lug grooves extending in the tire-width direction and having at least one end formed as a dead end located in the corresponding land area; and a plurality of sipes each extending so as to surround the corresponding lug groove, each sipe intersecting with the lug groove in question, and each sipe communicating with the corresponding single one of the circumferential main grooves at the two ends of the sipe;

wherein four of the circumferential main grooves each extending in the tread portion are formed in the tread portion, wherein five columns of the land areas are defined in the tread portion by the four circumferential main grooves, wherein a fine groove extending in the tire-circumferential direction and formed at the center of the land area is located in the center section of the tread portion, wherein a plurality of curved grooves formed in the land area are located in the center section of the tread portion, with each curved groove extending from either one of the circumferential main grooves towards the fine groove, wherein a plurality of sipes are formed in the land area located in the center section of the tread portion, each sipe extending from either one of the circumferential main grooves towards the fine groove, wherein the plurality of curved grooves and the plurality of sipes are arranged alternately in the tire-circumferential direction, and wherein each curved groove intersects with the corresponding sipe.

10. The pneumatic tire according to claim 9, wherein the dead end of the lug groove with the intersecting sipe is located closer to a shoulder section of the tire than the other end of the lug groove.

11. The pneumatic tire according to claim 9, wherein:

each sipe includes a pair of parallel sections extending in parallel with the corresponding lug groove, and each sipe and the corresponding lug groove are formed so as to satisfy a relationship:

$$L1/L=0.4 \text{ to } 0.6$$

where L is the distance in the tire-circumferential direction between the two parallel sections, and L1 is the distance from any one of the two parallel sections to the center position, in the groove width direction, of the corresponding lug groove.

12. The pneumatic tire according to claim 9, wherein the lug grooves and the sipes are formed in land areas located respectively in shoulder sections of the tread portion.

13. The pneumatic tire according to claim 9, wherein:

at least two of the circumferential grooves each extending in the tire-circumferential direction are formed in the tread portion, and the lug grooves and the sipes are formed in a land area located on the side that is closer to the tire center of a land area located in each shoulder section.

14. The pneumatic tire according to claim 9, wherein:

each curved groove formed in the land area located in the center section has a dead end located between the corresponding circumferential main groove and the fine groove, both the width and the depth of each curved groove formed in the land area located in the center section are gradually reduced from its open end towards its closed end, the sipes formed in the land area located in the center section communicate with the fine groove, and each sipe includes a deeper section located between the corresponding circumferential main groove and the intersection with the corresponding curved groove, and also includes a shallower section located between the fine groove and the intersection with the corresponding curved groove.

* * * * *